June 23, 1970    S. B. ÅGREN ET AL    3,516,520

FLUID SHOCK ABSORBER

Filed Aug. 23, 1967

INVENTORS
S.B. ÅGREN
E.A. STENMAN

BY Richards, Geier
ATTORNEYS

United States Patent Office 3,516,520
Patented June 23, 1970

3,516,520
FLUID SHOCK ABSORBER
Sven Birger Ågren, Ornskoldsvik, and Erkki Antero Stenman, Gullanget, Sweden, assignors to Aktiebolaget Hagglund & Soner, Ornskoldsvik, Sweden, a corporation of Sweden
Filed Aug. 23, 1967, Ser. No. 662,794
Int. Cl. F16d *57/00;* F16f *9/10*
U.S. Cl. 188—96                                          3 Claims

ABSTRACT OF THE DISCLOSURE

A shock absorber filled with a shock absorbing medium preferably consisting of a gas and oil emulsion and having a piston which is movable along with a piston rod in a cylinder and which constitutes a throttle valve with a valve body movable between two valve seat rings provided with openings for the passage of the medium.

---

This invention relates to a fluid shock absorber and refers more particularly to a shock absorber having a cylinder filled with the shock absorbing medium and having a piston movable therein which is provided with a throttle device through which the medium flows.

An object of the present invention is to improve shock absorbers of this type.

Other objects will become apparent in the course of the following specification.

In the accomplishment of the objectives of the present invention it was found desirable to provide a shock absorber having a valve which is used to open a flow passage in the piston when a predetermined pressure acting upon the movable valve portion is exceeded, whereby prior to the opening of the valve the medium, due to its own elasticity, permits a spring-like movement of the piston.

The invention will appear more clearly from the following detailed description when taken in connection with the accompanying drawing, showing by way of example, a preferred embodiment of the inventive idea.

Figure 1:
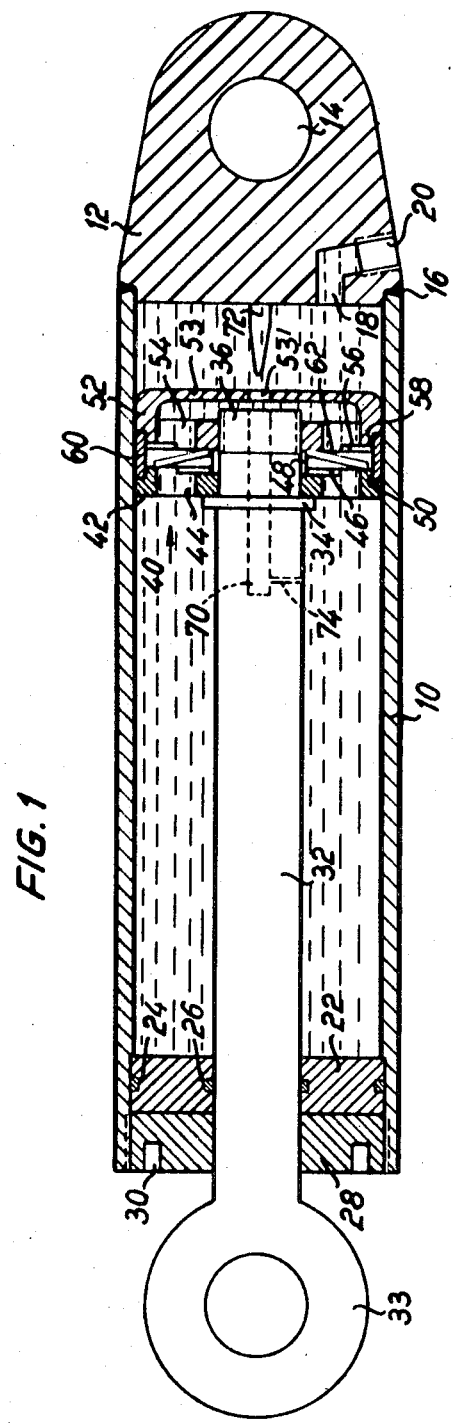
FIG. 1 is a longitudinal section through a shock absorber constructed in accordance with the present invention.

The shock absorber shown in the drawing has a cylinder 10 which is closed by a cover 12 having an opening 14 and shown on the right hand side of FIG. 1. The cover 12 is preferably fixed to the cylinder at 16 by soldering. The shock absorbing medium is an oil-gas emulsion which is introduced into the interior of the cylinder through a passage 18 which can be closed by a removable closure 20 provided with screw threads. At its opposite end the cylinder 10 is closed by a ring 22 provided with two sealing rings 24 and 26. The ring 22 is held in place by a screw 28 having recesses 30 adapted to receive a tool for the tightening of the screw 28. A piston rod 32 extends through the ring 22 and the screw 28 and is provided at its outer end with a ring 33. At its opposite end the piston rod has a flange 34 and a pin 36 carrying a valve device 40 constituting the piston of the piston ring. This valve device includes a first valve seat ring 42 which along its peripheral stretch is provided with several axial holes 44. Furthermore, the ring 42 has a radial groove 46, several projections 48 extending from that part of the ring which is located close to the pin 36, and an annular flange 50 formed upon the circumference of the ring 42. A second valve seat ring 52 is located at a distance from the ring 42. The ring 52 does not have the projections of the ring 42, but it does have axial holes 54, a radial groove 56 and an annular flange 58. However, the ring 52 has a cover portion 53 provided with an opening 53'. A cylindrical distancing ring 60 is located between the flange 50 of the ring 42, the flange 58 of the ring 52 and the cylinder 10 in order to maintain the rings 42 and 52 at the proper circumferential distance from each other. A conical resilient disc 62 constitutes the movable valve body; in its position of rest its inner circumferential edge lies against the ring 52, while its outer circumferential edge lies against the ring 42. The resilient disc 62 is guided axially by the projections 48. Thus the valve device 40 is closed in its position of rest.

Figure 2:
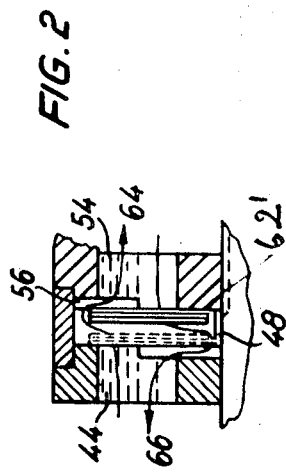
FIG. 2 is a section through a portion of a valve device of a somewhat different construction on an enlarged scale.

In the embodiment of FIG. 2, the conical resilient disc 62 is replaced by a disc 62' consisting of a plurality of flat discs. Furthermore, the projections 48 are replaced by a separate ring 48' with axially extending flanges which does not constitute a part of the rings 42 or 52. It is important that the space between these flanges should permit an adjusted flow possibility for the shock absorbing medium between the two chambers of the cylinder formed by the valve device.

In use, the shock absorbing medium operates resiliently when the amplitudes of the piston are comparatively small. The resilient operation is then comparatively free from losses. When the amplitudes are increased, the pressure in one of the chambers of the cylinder can become so great that the disc 62 of FIG. 1 will be pressed flat and will assume the shape of the disc 62' of FIG. 2. Then the disc will assume a position which is between the position of rest in FIG. 1 and the two positions shown in FIG. 2. If, when the piston rod is moved outwardly, the pressure in the chamber between the valve device 40 and the ring 22 is sufficiently great, the disc will assume the right hand position indicated by full lines in FIG. 2. When the piston rod is moved inwardly and when pressure on the other side of the valve device is sufficiently great, the disc will assume the left hand position indicated by broken lines in FIG. 2. In the first instance the shock absorbing medium flows in the direction of the arrow 64 from the left hand chamber (FIG. 2) through the holes 44, around the outer circumference of the disc, through one of the grooves 56 and through the hole 54 to the right hand chamber. In the other instance the medium flows in the direction of the arrow 66 from the right hand chamber through the hole 54, through the space between the disc and the flange 48, through the groove 46 and the hole 44 and into the left hand chamber. The throttling action thus provided by the valve device 40 for the flow, is regulated by the disc 62 or 62'. The amount of pressure required to move the disc from one valve seat or the other valve seat is determined by the pre-tension of the resilient disc. The extent of opening of the spring and thus the shock absorbing force are determined by the draw-out speed according to a value which can be selected depending upon the change in the characteristics of the spring, or by different pre-tensions of the spring or also by turning the spring over. It is thus possible to provide different piston forces for the same piston speed or vice versa, namely when pulling the piston out, pulling it in or vice versa.

Besides the throttling produced by the resilient spring, it is also obviously possible to complement the apparatus by fixed throttling devices.

To prevent the piston rod 32 from striking hard, it is provided with an axial bore hole 70 which cooperates with a substantially conical pin 72 fixed in the cover 12. The hole 70 communicates close to its bottom with a hole 74 having a very small diameter. When the valve device 40 constituting the piston approaches the cover 12, the flow passage through the hole 53' keeps increasing so that the shock absorbing medium is closed in between the cover portion 53 of the ring 52 and the cover 12 of the casing 10. In the course of further compression of the medium it prevents the cover portion 53 from striking the cover 12. Obviously, a small amount of the shock absorbing medium can circulate through the narrow hole 74.

It is apparent that the examples described above have been given solely by way of illustration and not by way of limitation and that they are capable of many variations and modifications within the scope of the present invention. All such variations and modifications are to be included within the scope of the present invention.

What is claimed is:

1. A shock absorber comprising a casing adapted to be filled with a shock absorbing medium, a piston rod movable with said casing, a piston carried by said piston rod within said casing and constituting a throttle device comprising a rigid valve seat ring engaging an inner surface of said casing and having axial holes and a radial groove, another rigid valve seat ring engaging an inner surface of said casing and spaced from the first-mentioned valve seat ring, and having a cover provided with an opening and extending over an end of said piston rod, axial holes and a radial groove, and a valve body located between said two valve seat rings and movable by pressure of said medium into engagement with any one of said valve seat rings.

2. A shock absorber in accordance with claim 1, wherein the first-mentioned valve seat ring comprises projections extending toward the second-mentioned valve seat ring and located close to the inner circumference thereof, and wherein said valve body consists of a conical resilient disc, whereby in a position of rest an inner edge of said disc engages one of said valve seat rings and the outer edge of said disc engages the other one of said valve seat rings, the inner and outer edges of said disc being adapted to engage the same one of the two valve seat rings when corresponding pressure is exerted upon said disc.

3. A shock absorber in accordance with claim 10, comprising a small ring extending between the two valve seat rings and wherein said valve body consists of a plurality of interconnected flat discs movable by pressure of said medium into engagement with any one of said valve seat rings.

References Cited

UNITED STATES PATENTS

| | | |
|---|---|---|
| 1,588,780 | 6/1926 | Stanzel et al. |
| 2,320,697 | 6/1943 | Binder. |
| 3,106,993 | 10/1963 | May. |
| 3,312,312 | 4/1967 | Bourcier de Carbon. |
| 3,367,454 | 2/1968 | Schenk et al. |

ARTHUR L. LA POINT, Primary Examiner

H. BELTRAN, Assistant Examiner

U.S. Cl. X.R.

188—88; 267—1, 65